Sept. 21, 1948. A. B. PUDDICOMBE 2,449,715
POSTURE DEMONSTRATING DEVICE
Filed April 19, 1946 2 Sheets-Sheet 2
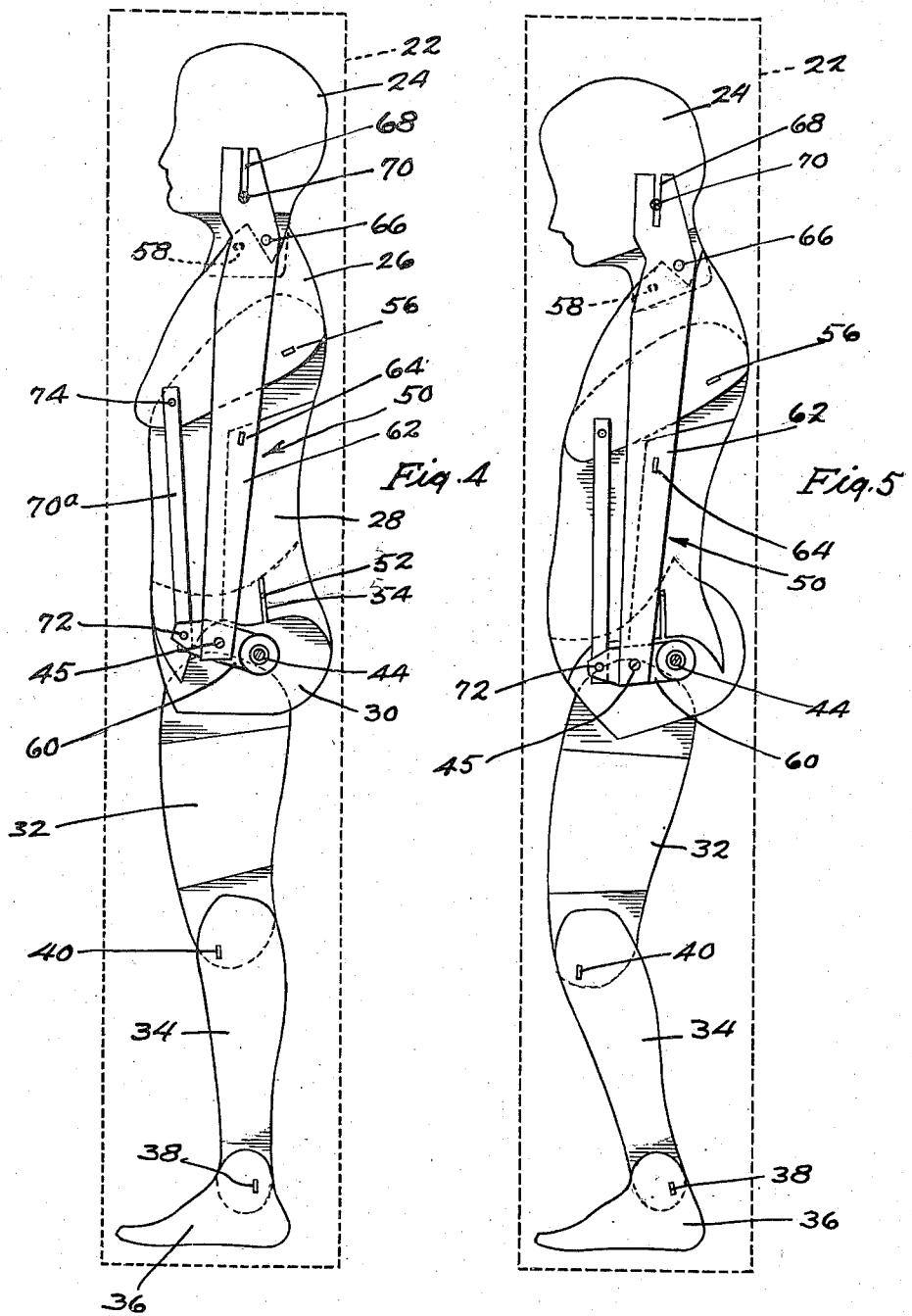
INVENTOR.
Albert Bruce Puddicombe Patented Sept. 21, 1948

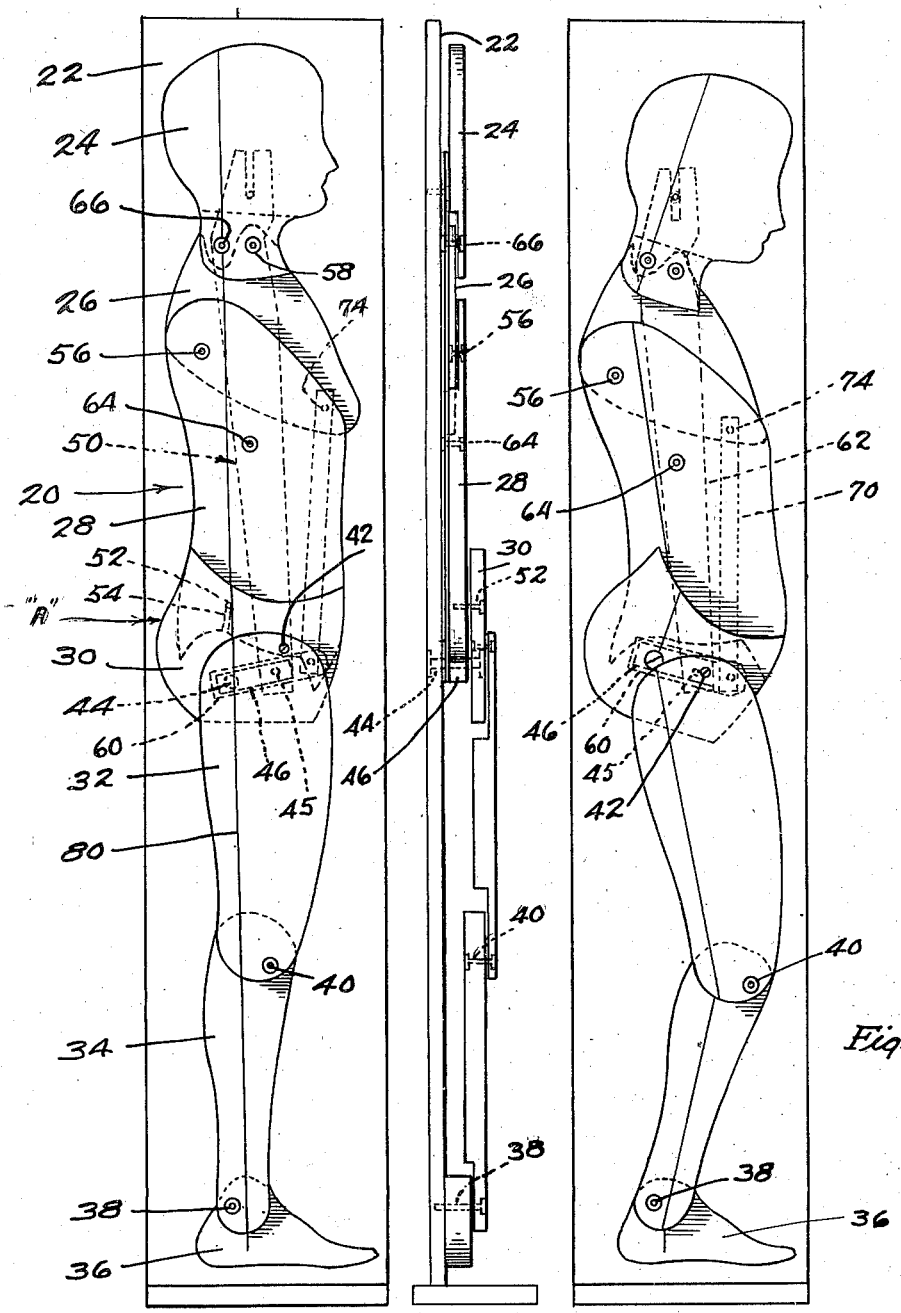

2,449,715

UNITED STATES PATENT OFFICE 2,449,715

POSTURE DEMONSTRATING DEVICE

Albert Bruce Puddicombe, North Hollywood, Calif., assignor to Bernard H. Stauffer, Los Angeles, Calif.

Application August 19, 1946, Serial No. 691,536

2 Claims. (Cl. 35—29)

Incorrect posture is perhaps one of the common causes of many of the ailments which torture mankind, for incorrect posture over a period of time results in deformity of the spinal tract, whereby restricting pressure is placed upon nerve centers controlling reflexes throughout the body, and which condition can and does cause, in aggravated cases, physical deformity, impaired physical functions, aches and pains from which ordinary therapy can give no relief.

The preceding statement is largely a matter of common knowledge, however, many people, while being aware that correctness of posture is desirable from a health standpoint, do not understand the reasons why posture is important, nor do they understand the forces at play when the spinal tract is distorted, nor do they associate such a condition with carelessness or slouching in either standing or sitting position.

Accordingly and in view of the preceding statement, it is a prime object of the present invention to provide a simple, practical and efficient means to visually demonstrate impairment of normalcy in the spinal tract due to incorrect posture.

A feature of the invention resides in the scaled relationship between the device and an average human form whereby direct analogy may be made therebetween for lecture and other demonstrative purposes.

An advantage of the present invention resides in the fact, that the device being small, is readily transported from place to place for demonstrating or other exposition, whereby a great many people may be shown visually, the effect of incorrect posture and its relationship to good health and vigor.

A further advantage of the invention resides in the fact that as conceived, the device is easily, quickly and cheaply made, the several component parts thereof being preferably sawed from plywood, while the metal strips used to form the leverage system to obtain or effect integrated movement of the several parts of the device, are readily available at low cost, thus bringing the educational advantages thereof, within the economic reach of all interested persons or groups, such as schools, gymnasiums, health centers, medical centers and others.

Other objects, features and advantages of the invention may be apparent from the following specification, the subjoined claims, and the accompanying drawing.

In the drawing:

Figure 1 is a front elevational view demonstrating correct standing posture, and showing the several divisional component parts of the device in hinged relationship, the one with respect to the other, whereby pivotal movement thereof is obtainable and comparable in movement with analogous parts of the body; and, Figure 2 is a side-elevational view showing construction and disposition of parts shown in both full and in dotted lines in Figure 1.

Figure 3 is a view similar to Figure 1, excepting that the above referred to, "several divisional component parts of the device," have been moved in conformity with natural physical processes inherent in incorrect posture, whereby deformity and/or misalignment of the spinal tract at each of the critical fulcrum points of the skeletonal frame of the body is shown in clear and understandable form.

Figure 4 is a view analogous to Figure 1, excepting that here the leverage mechanism used to control movement of the several divisional component parts of the device, is shown in detail: and Figure 5 is a view generally analogous to Figure 3, excepting that in this view the leverage system is shown in elevation in the position to which it is moved to illustrate incorrect posture.

In the drawing the reference character 20 indicates the device of this invention, as a whole, being functionally supported upon a suitable back-drop or standard 22, as will be more particularly pointed out as this text is developed.

Since the device of this invention is formed of a plural number of separable pieces or elements which bear direct analogy to the several major divisional parts of the human body, such parts or elements of the device may be identified as follows, and in which the reference character 24 indicates the head and neck, while the numerals 26, 28, 30, 32, 34, and 36 in their order, respectively indicate, the shoulders, the trunk or torso, the pelvic region, the upper leg, the lower leg, and the feet.

As shown in the drawing, the feet are immovably and fixedly secured to the standard 22, while the ankle portion of the lower leg is hingedly connected at 38 with the feet 36, while a pin or other suitable mechanical arrangement 40 hingedly joins the upper and lower leg in forming a knee joint.

A screw or pin 42 extending from the upper portion of the upper leg 32 into the part 30 serves to form the joint between the upper leg and pelvic region or the hips. A screw 44 extends through the part 30 and the filler block 46 and into the standard 22, provides a fulcrum point about which the leverage system 50, used to actuate the device, is rotatable, and also serves as a hinge form movement of the pelvic or hip portion 30 in its articulated relationship to the device as a whole.

A pin 52 in the part 30 and extending inwardly toward the standard 22 therefrom, is adapted to move through a slot 54 formed in the lower edge portion of the torso 28, serves to impart movement to the torso as will be more fully set forth in connection with a description of functional use.

The torso and shoulder are hingedly united by means of a suitable pin 56, and the head 24 and shoulder 26 are hingedly joined one to the other by means of the pin 58 or other suitable means the equivalent thereof.

Attention is now directed to the leverage system 50 which is adapted to impart articulated movement to several of the divisional parts of the device.

As shown in the drawing, a metal plate or lever 60 lies upon the inner face of the filler block or spacer 46 and is held immovable with respect thereto by means of screw 44 and the screw 45, the latter of which also serves as a means to hingedly secure a vertically disposed metal strap 62 in functional relationship thereto. The strap 62 is fulcrumed upon the part (torso) 28 by means of the pin 64, and is provided with a pin 66 fixedly secured thereto and which extending through a V notch formed in the upper edge portion of the part 26, enters the neck-like portion of the part 24 to impart relative movement thereto. The extreme upper end of the strap 62 is slotted as shown at 68 to receive a pin 70 fixedly secured in the standard 22, the pin and slot arrangement serving to permit movement in the strap 62 while concurrently holding movement thereof within fixed limits to obtain a movement of the several parts of the device which closely approximate movement of corresponding parts of the body when in incorrect posture.

A second strap, or strap 70a is hingedly secured or joined at 72 with the lever 60 in the forward end portion thereof, and at 74 to the part 26 at a point thereon which would correspond with the chest in the human body, thereby providing means to raise and lower or to provide articulated movement therein when other parts of the device are actuated as will be subsequently shown.

As previously stated, the prime object of the invention is to provide, a simple, practical, and low cost means to visually demonstrate correct and incorrect posture, and at the same time, to show the manner in which each of the several major parts of the body move in re-alignment from normalcy when the pelvic region is moved from balance, and whereby undue pressure is placed upon the spinal tract or portions thereof. The device also demonstrates visually, the deleterious effect of bad posture upon the chest, and the abdomen, in as much as the former definitely moves toward a flat and collapsed condition, while the abdomen sags, thereby permitting many of the internal organs to drop away from normal functioning position.

As shown in Figure 1, the line 80 is indicative of normalcy of posture, in which position, the head is erect with the chin and chest out so that full normalcy of respiratory action may be had, and at the same time, the abdomen is drawn in and is taut, so that the lower organs are held back in normal position, and thereby normal functioning thereof may be had.

If finger pressure is placed upon the pelvic part 30 as indicated by the arrow "A," the upper and lower leg hinge forewardly upon the knee portion 40, while the lower leg 34 pivots at 38 upon the fixed or immovable foot portion 36. Such movement of the pelvic region effects a foreshortening of the over-all length of the leg and is indicative in the human body of a dropped or lowered pelvic bone. At the same time, the pin 52 moving with the part 30 and operating through the slot 54 in part 28, thrusts the lower torso 28 forwardly, giving the effect of a sagged abdomen, while concurrently therewith, the spacer 46 and the lever 60, moving with the part 30 in partial rotation around the screw 44, causes the strap 70a to move downwardly and causing the chest 26 to move toward a lower and more flattened position, as is clearly shown in Figure 3.

Movement of the lever 60 also causes the strap 62 to be lowered and causes the part 28 to slump downwardly by reason of the connection thereof with the strap 62 through the pin 64, and the abdomen of the part 28 is caused to slouch forwardly because of pressure placed thereon by movement of the pin 52 operating in the lost motion slot 54 as previously mentioned. The movement thus had, clearly shows in true likeness, the degree of sag in the abdomen when in such incorrect posture as standing with one knee in bent position, as illustrated in Figure 3; also, since the parts 26 and 28 are hingedly connected by means of the pin 56, and since the strap 70a is connected with the part 26 through pin 74, movement of the strap 70a causes the part 26 to be given a movement which tends to rotate about the pin 56 while being concurrently moved downwardly with the part 28. At the same time the part 24, being hingedly connected with the part 26 by pin 58, is moved in a rotational direction about the axis of the pin 58, causing a lowering of the head (part 24) to substantially the positions shown in Figures 3 and 5.

The pin 70 which is fixedly secured in the standard 22, operates through the lost motion slot 68 and holds the strap 62 in substantially vertical alignment, yet at the same time permitting enough lateral movement in the other end portions to accommodate such movement as may be necessary in view of the connection thereof with the plate 60 and movement of the spacer 46 and plate in partial rotation around the axis of the screw 44.

In describing an interlocked movement of the type herein involved, a start must be made at one given point, however it will be apparent that upon rocking the pelvic member 30 upon the fulcrum 44, all of the related and mechanically joined parts start to move to or from their then point of beginning, and all fall into or move away from a slouching position simultaneously or substantially so, and not in detached movement of first one of the component parts and then of a second component part, and so through the whole of the assembly.

The preceding description of construction involved in making the device of this invention and of articulated movement between the several component elements, is believed to be inclusive thereof, and from which it will be apparent to those concerned that I have developed a novel means in a mechanical device to visually demonstrate the relationship between incorrect posture and abnormalcy of position of the head, chest and abdomen, including tortuous bends and pressure points created in the spinal column as indicated by each of the several breaks in line 80 of Figure 3.

It is further believed that if the demonstration which is here made possible, will be seriously studied and correct observation thereof made, that better posture, with entailed better health and vigor will follow.

Having thus described my invention in its presently preferred form, and while being aware that variations in form thereof may be had, that which I believe to be new and within the scope of the invention is defined in the following claims.

I claim:

1. In a device of the character described, two articulated parts formed in simulation of corresponding parts of the human body, and means to move said parts to and from a normalcy compatible with accepted standards of correct human posture when in standing position, said means comprising two metal straps, one of said straps being hingedly joined to a head part and a trunk part of said device, the other of said straps being hingedly joined to the chest part of said device, both of said straps also being hingedly connected with the hip part of said device, and a lost motion means operating between said hip part and said trunk part, whereby upon clockwise rotation of said hip part said trunk part is extended, a principal fulcrum means extending through the hip part of said device and a standard to support said fulcrum, and with it said device in operative position.

2. In a posture indicating device, including a standard to support said device, a plural number of articulated parts formed in simulation of analogous parts of the human body, a pelvic region part, said part being oscillatable about the longitudinal axis of a screw passing through said part and into said standard, a leg part, said leg part being hingedly connected with said pelvic region part and with an immovable foot part, a trunk part, a shoulder part, and a head part, said trunk and head parts being hingedly joined with said shoulder part, said head, shoulder and trunk parts being articulated with respect to said pelvic and leg parts, and a leverage system to actuate certain of said parts in simulation of movement of analogous parts of the body when in incorrect posture, said leverage system being movable in response to movement of said pelvic part and being hingedly joined to said trunk, shoulder and head parts, and means operable between said pelvic and trunk parts to move the lower end of said trunk forwardly upon clockwise rotational movement of said pelvic portion.

ALBERT BRUCE PUDDICOMBE.

REFERENCES CITED

The following references are of record in the file of this patent:

UNITED STATES PATENTS

| Number | Name | Date |
| --- | --- | --- |
| 2,118,093 | McCue | May 24, 1938 |
| 2,136,207 | Ewerhardt | Nov. 8, 1938 |
| 2,180,181 | Versoy | Nov. 14, 1939 |